United States Patent
Kwon et al.

(10) Patent No.: US 8,868,097 B2
(45) Date of Patent: Oct. 21, 2014

(54) FREQUENCY SPECTRUM SENSING METHOD USING PILOT SIGNAL AND COGNITIVE RADIO SYSTEM USING THE SAME

(75) Inventors: Tae Soo Kwon, Gyeonggi-do (KR); Hyun Gi Ahn, Incheon (KR); Tae In Hyon, Gyeonggi-do (KR); Kyung Hun Jang, Gyeonggi-do (KR); In Sun Lee, Gyeonggi-do (KR); Youngsoo Kim, Seoul (KR); Hyo Sun Hwang, Seoul (KR); Hyun Ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 12/039,901

(22) Filed: Feb. 29, 2008

(65) Prior Publication Data
US 2009/0117914 A1   May 7, 2009

(30) Foreign Application Priority Data

Nov. 6, 2007 (KR) .................. 10-2007-0112849

(51) Int. Cl.
*H04W 72/00* (2009.01)
*H04W 4/00* (2009.01)
*H04W 16/14* (2009.01)

(52) U.S. Cl.
CPC .................................... *H04W 16/14* (2013.01)
USPC ............................ 455/454; 455/450; 455/447

(58) Field of Classification Search
USPC ........ 455/418, 454, 426.1, 552.1, 553.1, 522, 455/1, 127.1, 456.1–457, 450–453, 455/446–449, 63.1, 114.2, 443, 444, 455/67.13–67.7, 71, 75, 77, 501, 455/434–435.3; 370/329, 330, 338, 328, 370/331, 252
See application file for complete search history.

(56) References Cited

U.S. PATENT DOCUMENTS

| 5,586,122 | A | * | 12/1996 | Suzuki et al. | 370/347 |
| 5,901,145 | A | * | 5/1999 | Sawyer | 370/332 |
| 6,683,862 | B1 | * | 1/2004 | Kim et al. | 370/342 |
| 7,502,340 | B1 | * | 3/2009 | Chuang et al. | 370/318 |
| 2007/0064770 | A1 | | 3/2007 | Horiguchi | |
| 2008/0020792 | A1 | * | 1/2008 | Falk et al. | 455/517 |
| 2008/0025208 | A1 | * | 1/2008 | Chan | 370/217 |
| 2008/0186949 | A1 | * | 8/2008 | Hafeez et al. | 370/350 |

FOREIGN PATENT DOCUMENTS

| EP | 1 750 466 A1 | 2/2007 |
| EP | 1 850 609 A1 | 10/2007 |
| JP | 2003-244161 A | 8/2003 |

(Continued)

OTHER PUBLICATIONS

A Novel On-Demand Cognitive Pilot Channel Enabling Dynamic Spectrum Allocation by Perez-Romero et al. Issue Date: Apr. 17-20, 2007.*

(Continued)

*Primary Examiner* — Daniel Lai
(74) *Attorney, Agent, or Firm* — NSIP Law (57) ABSTRACT

An operation method of a radio communication station is provided. The operation method of a radio communication station, the operation method including: transmitting a basic pilot signal to at least one terminal located in a coverage of a preoccupied system; and transmitting a cognitive radio (CR) pilot signal.

10 Claims, 6 Drawing Sheets

(56) References Cited

FOREIGN PATENT DOCUMENTS

| | | |
|---|---|---|
| JP | 2006-060322 A | 3/2006 |
| JP | 2007-074718 A | 3/2007 |
| JP | 2007-529130 A | 10/2007 |
| KR | 2007-43604 | 4/2007 |
| KR | 10-2007-0048530 | 5/2007 |
| KR | 2007-48553 | 5/2007 |
| KR | 2007-48555 | 5/2007 |
| KR | 2007-49091 | 5/2007 |
| WO | WO 2006/085471 A1 | 8/2006 |

OTHER PUBLICATIONS

Network Selection Process Based on In-band and Out-band Cognitive Pilot Channel in the end-to-end Reconfigurable System by Ji Yang, Apr. 26, 2006.*
Japanese Office Action issued Aug. 28, 2012 in counterpart Japanese Application No. 2008-113072 (3 pages, in Japanese).
Korean Office Action issued May 3, 2013 with respect to counterpart Korean Application No. 10-2007-0112849 (4 pages, in Korean).
Japanese Office Action issued Jun. 11, 2013 with respect to counterpart Japanese Application No. 2008-113072 (2 pages, in Japanese).

* cited by examiner

FREQUENCY SPECTRUM SENSING METHOD USING PILOT SIGNAL AND COGNITIVE RADIO SYSTEM USING THE SAME

CROSS-REFERENCE TO RELATED APPLICATION

This application claims the benefit of Korean Patent Application No. 2007-112849, filed in the Korean Intellectual Property Office on Nov. 6, 2007, the disclosure of which is incorporated herein by reference.

BACKGROUND OF THE INVENTION

1. Field of the Invention

Aspects of the present invention relate to a frequency spectrum sensing method using a pilot signal in a communication system using a cognitive radio (CR) technology, and more particularly, to a method of sensing a frequency spectrum of a preoccupied system in a CR system where the preoccupied system periodically or a periodically transmits a pilot signal between the preoccupied system and CR system.

2. Description of the Related Art

Dramatic developments of wireless communication technologies and development of various wireless communication services need a strict frequency band to overcome a coexistence issue among existing communication systems. However, since almost all frequency bands commercially usable are already allocated, frequency resources for a new wireless platform are lacking. GHz band, particularly in the lower range frequency bands can seldom be used. Currently, a cognitive radio (CR) technology, which can sense and use a frequency band which is allocated but not used, is provided to overcome such a disadvantage.

In a wireless communication system in a conventional art, frequency resources are strictly controlled by a government according to a frequency policy. Accordingly, providers have to be approved by a government to use frequency resources. However, frequency-allocated frequency resources not being used can be used in a CR technology unlike a wireless communication system in the conventional art.

Thus, a spectrum sensing method which can reduce complexity and a sensing time, and improve a spectrum resource use rate in comparison with a spectrum sensing method of a CR system in a conventional art is provided.

SUMMARY OF THE INVENTION

Aspects of the present invention provide a method which periodically or a periodically transmits a pilot signal between a preoccupied system and a cognitive radio (CR) system in a wireless communication system using a CR technology, and thus a CR communication system can recognize the preoccupied system. Aspects of the present invention also provide a new communication scheme where a preoccupied system cooperates with a wireless communication system to sense a spectrum in all wireless communication networks sharing the spectrum. Aspects of the present invention also provide a communication method where a preoccupied system cooperates with a wireless communication system for spectrum sensing of a CR system in a wireless communication network, and thus a wireless resource can be efficiently used.

According to an aspect of the present invention, there is provided an operation method of a radio communication station, the operation method including: transmitting a basic pilot signal to at least one terminal located in a coverage of a preoccupied system; and transmitting a cognitive radio (CR) pilot signal, wherein the CR pilot signal has a signal pattern to be used when at least one CR terminal senses a frequency spectrum used by the preoccupied system.

According to another aspect of the present invention, there is provided a radio communication station, wherein the radio communication station transmits a basic pilot signal to at least one terminal located in a coverage of a preoccupied system, and transmits a CR pilot signal having a signal pattern to be used when at least one CR terminal senses a frequency spectrum used by the preoccupied system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the present specification, a preoccupied system refers to a system which is currently using a spectrum, and a cognitive radio (CR) system refers to a system which senses a spectrum in use and uses an unused spectrum. However, the definition above is simply to help understand the present invention, and it will be apparent to those skilled in the related art that the terminology is not limited to the definition. Also, in the present specification, CR indicates a technology which can automatically retrieve an unused frequency based on an area and time, protect a neighboring authorized radio station, and enable a desirable communication to be performed. Specifically, a widely spread unused spectrum where an occupied time continuously varies is retrieved, and a frequency bandwidth, output, modulation method, and the like are determined and reused according to an environment. Accordingly, an efficiency of frequency, which is a limited resource, can be improved.

Figure 1:
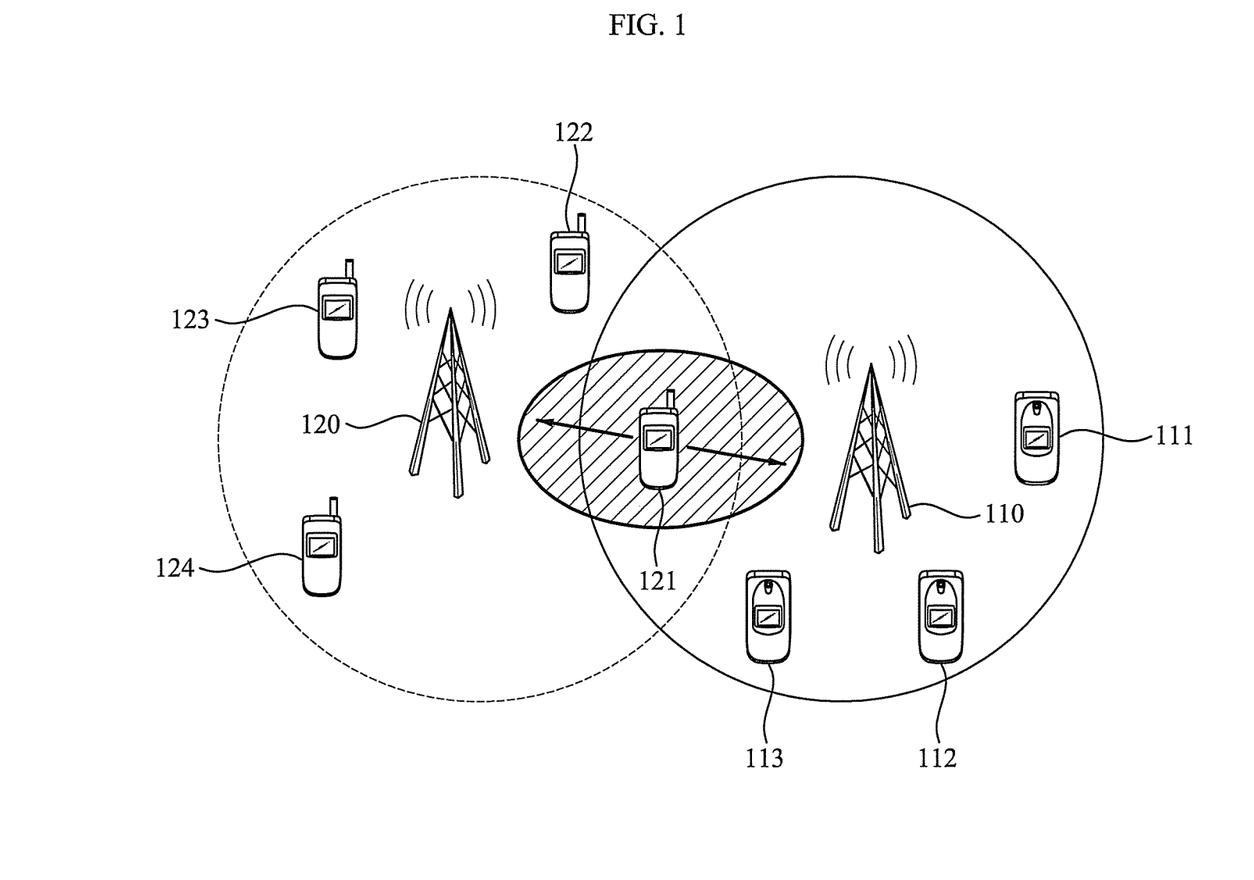
FIG. 1 illustrates a cognitive radio (CR) system and a preoccupied system according to an embodiment of the present invention.

FIG. 1 illustrates a wireless communication system using a CR technology according to an embodiment of the present invention. Referring to FIG. 1, a CR base station (BS) 120 manages CR terminals 121, 122, 123, and 124 receiving a service of a CR system. Also, a preoccupied BS 110 manages preoccupied terminals 111, 112, and 113.

The CR BS 120 and the CR terminals 121, 122, 123, and 124 can sense all frequency spectrums which can be used by the CR system. Even when the CR terminal 121 uses an unused frequency spectrum of frequency spectrums provided by the preoccupied BS 110, and when the preoccupied terminals 111, 112, and 113 of the preoccupied BS 110 occupy a particular frequency, interference is needed to be monitored in order not to interfere with the occupied frequency while the frequency is being used.

Figure 2:
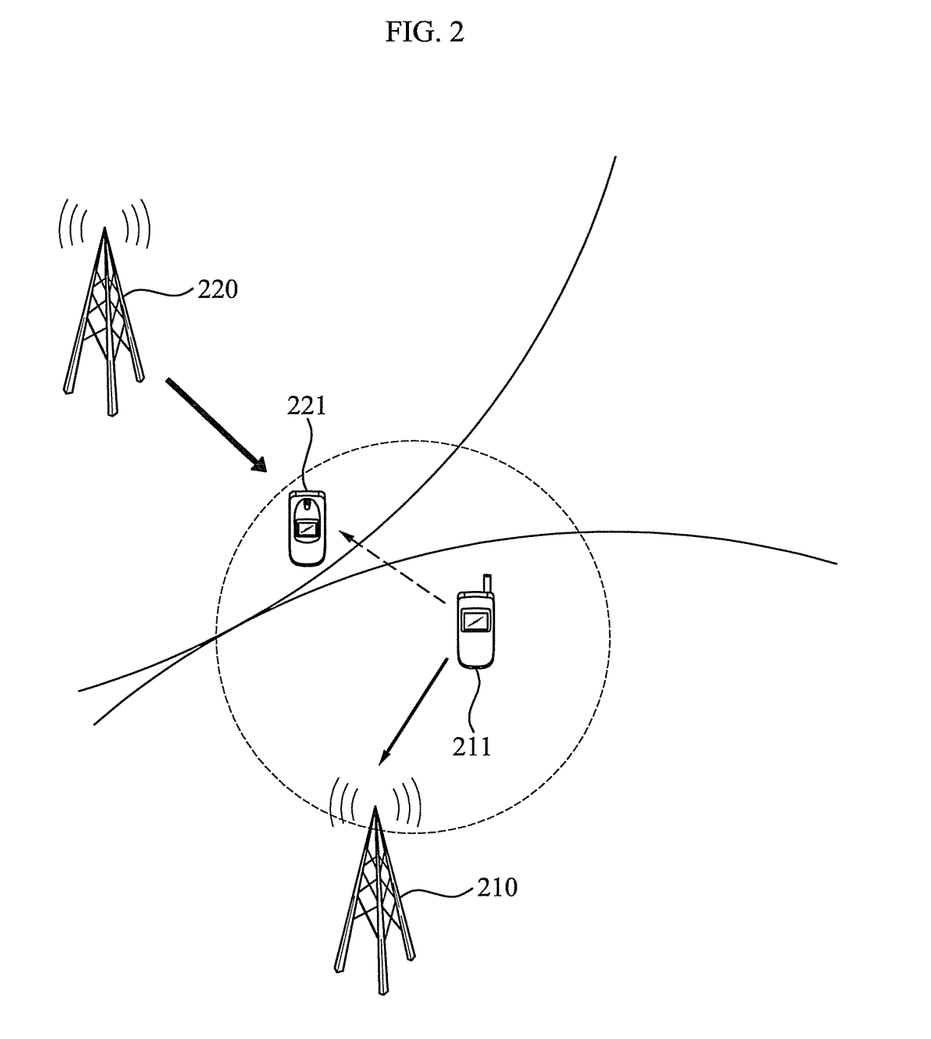
FIG. 2 illustrates a case when a spectrum sensing is needed in a CR system according to an embodiment of the present invention.

FIG. 2 illustrates a case when a frequency sensing is needed so that a CR BS 210 does not interfere with a preoccupied system according to an embodiment of the present invention. As illustrated in FIG. 2, a preoccupied BS 220 and a CR BS 210, which use a same frequency band, cannot sense each other. The preoccupied BS 220 is a serving station of terminal A 221, and the CR BS 210 is a serving station of terminal B 211. The CR BS 210 does not interfere with terminal A 221. However, when receiving data from the CR BS 210, terminal B 211 is affected by a signal of the preoccupied BS 220. Also, when transmitting the data to the CR BS 210 via an uplink, terminal B 211 can interfere with terminal A 221.

Particularly, when a user area of the preoccupied system is adjacent to an area of the CR system, the CR BS cannot sense a primary user signal In this instance, when the CR BS 210 occupies a channel used by terminal A 221, a downlink signal to terminal B 211 from the CR BS 210 does not interfere with the preoccupied BS 220, and thereby can be used, whereas an uplink signal can interfere with the preoccupied BS 220. In order to prevent the above-described interference from occurring and obtain a reliable sensing result, a method of determining whether a preoccupied terminal exists in an overall coverage through a distribution sensing method is needed. The distribution sensing method senses a BS as well as all terminals located within coverage.

Figure 3:
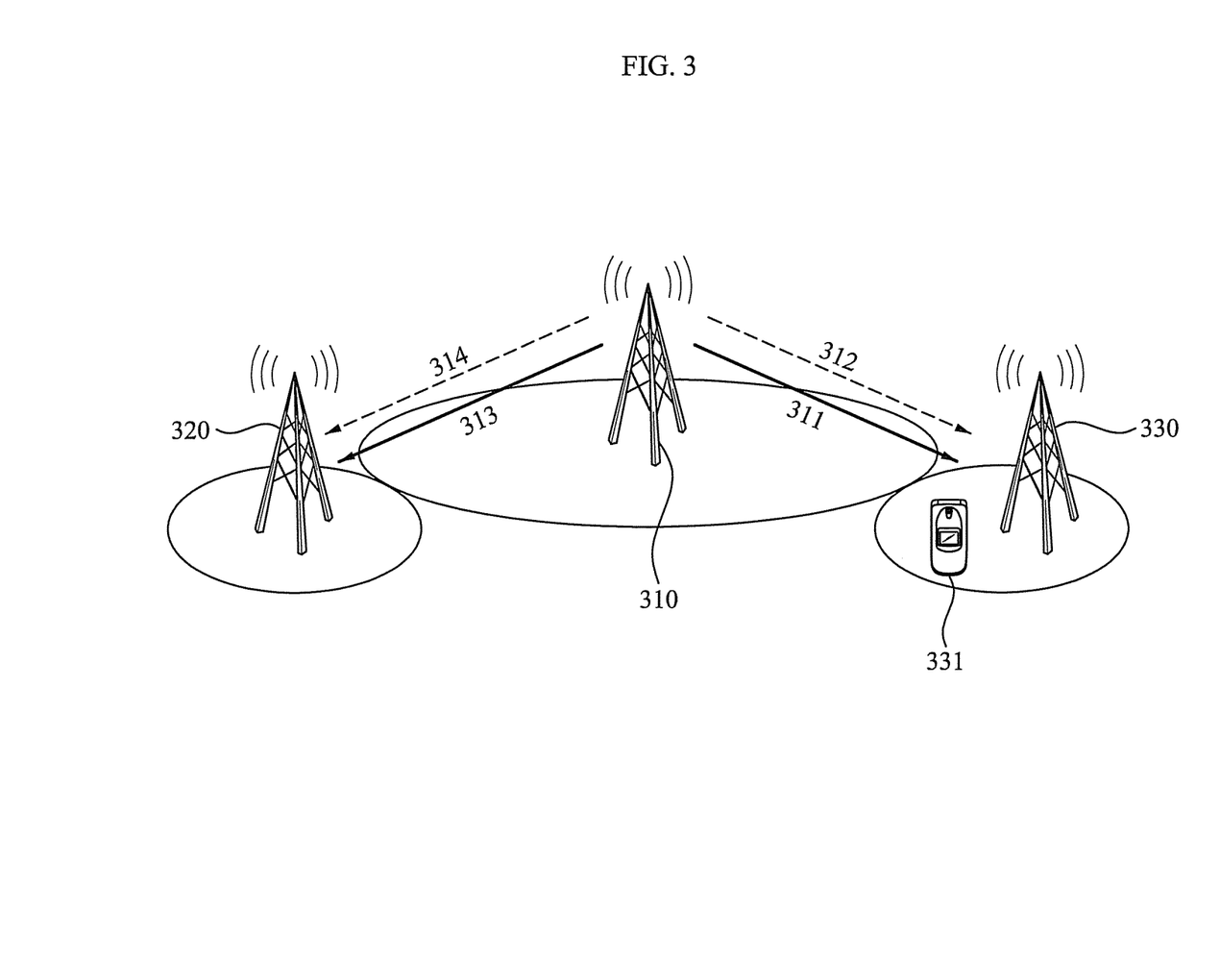
FIG. 3 illustrates an operation of a preoccupied system according to an embodiment of the present invention.

FIG. 3 illustrates an operation of a preoccupied system and a CR system according to an embodiment of the present invention. As illustrated in FIG. 3, a preoccupied BS 310 transmits pilot signals 312 and 314 and synchronizes with terminals to communicate with the terminals. The preoccupied BS 310 is a serving station of the terminals. Also, the preoccupied BS 310 transmits data 311 and 313, needed in a corresponding terminal, via downlink, or receives data transmitted from the terminal via uplink. Also, CR base stations 320 and 330 and a CR terminal 331 exist around the preoccupied BS 310. The CR terminal 331 is served by the CR BS 320.

The preoccupied BS 310 transmits a basic pilot signal and a CR pilot signal as a previous process for transceiving data from/to the terminals. The CR pilot signal can have a unique signal pattern for each frequency spectrum or for each system as a signal transmitted by the preoccupied BS 310 in order not to interfere with the preoccupied system. The interference is caused by sensing a frequency spectrum being used by the preoccupied system.

For example, when the frequency spectrum is divided into spectrum 1, spectrum 2, spectrum 3, spectrum 4, and spectrum 5, CR pilot signal 1, CR pilot signal 2, CR pilot signal 3, CR pilot signal 4, and CR pilot signal 5 can be set with respect to each of the spectrums. Accordingly, when the preoccupied system communicates with the terminals using spectrum 3, the preoccupied BS 310 periodically or a periodically transmits CR pilot signal 3. When the CR terminal 331 desires to use spectrum 3, CR pilot signal 3 transmitted by the preoccupied BS 310 is sensed. When CR pilot signal 3 is sensed as a result of the sensing, the CR terminal 331 does not use spectrum 3. When CR pilot signal 3 is not sensed, the CR terminal 331 communicates using spectrum 3 since interference with respect to the preoccupied BS 310 is not generated, even when the CR terminal 331 transmits data via an uplink using spectrum 3.

The CR pilot signal can be set to have a signal pattern for each of the frequency spectrums and to have a particular signal pattern for each system.

The preoccupied BS 310 transmits a CR pilot signal corresponding to a frequency spectrum used by the preoccupied BS 310, and thus the CR terminal 331 sensing the CR pilot signal cannot use the frequency spectrum. The preoccupied BS 310 checks a load of the preoccupied system when transmitting the CR pilot signal. Specifically, in a case of downlink data, the preoccupied BS 310 checks a queue in a buffer to check the load. In a case of uplink data, the preoccupied BS 310 checks the load according to a data request from each terminal to check the load of the preoccupied system.

As a result of the checking the load, when the load is significant, transmission power of the CR pilot signal is to be increased so that a use of a corresponding frequency spectrum of the CR base stations 320 and 330 decreases. When the load is insignificant, the transmission power of the CR pilot signal is to be decreased so that the use of the corresponding frequency spectrum of the CR base stations 320 and 330 increases. As described above, the preoccupied system determines the transmission power of the CR pilot signal and transmits the CR pilot signal with the determined transmission power.

Specifically, the transmission power of the CR pilot signal can be set to continuously increase up to a transmission power threshold value in proportion to the load of the preoccupied system. Alternatively, the preoccupied BS 310 can store and use the transmission power of the CR pilot signal in a form of lookup table. The transmission power of the CR pilot signal corresponds to the load of the preoccupied system. A value of transmission power of the CR pilot signal stored in the lookup table is to be set to be greater as the load of the preoccupied system increases.

Figure 4:
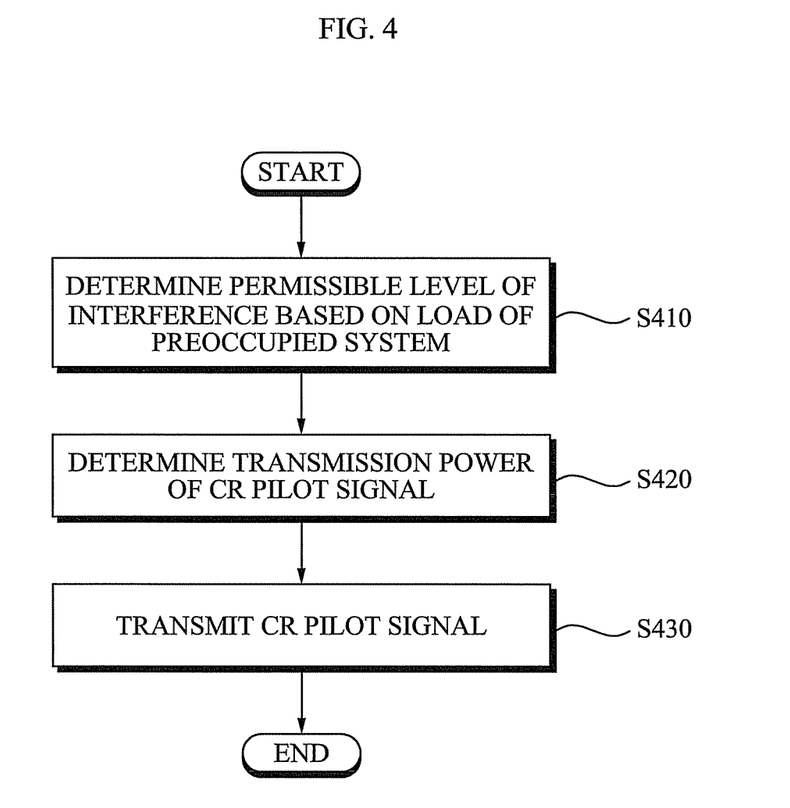
FIG. 4 illustrates an operation of a preoccupied station of FIG. 3.

FIG. 4 illustrates an operation of the preoccupied BS 310 of FIG. 3. The preoccupied BS 310 performs an operation of determining transmission power of a CR pilot signal before transmitting the CR pilot signal.

In operation S410, the preoccupied BS 310 determines a permissible level of interference based on load of a preoccupied system. When the load of the preoccupied system is significant, the permissible level of interference is to be decreased to be less affected by a CR terminal. When the load of the preoccupied system is insignificant, the permissible level of interference by the CR terminal can be increased. The permissible level of interference can be referred to as an access permission level of a CR system. When the permissible level of interference is significant, the access permission level of the CR system is also significant.

In operation S420, the preoccupied BS 310 determines the transmission power of the CR pilot signal based on the determined permissible level of interference of the CR system. When the permissible level of interference of the CR system is significant, the preoccupied BS 310 decreases the transmission power of the CR pilot signal. When the permissible level of interference of the CR system is insignificant, the preoccupied BS 310 increases the transmission power of the CR pilot signal. Specifically, as the permissible level of interference of the CR system increases, the preoccupied BS 310 can set the transmission power of the CR pilot signal to be gradually increased, and to be between a minimum threshold and a maximum threshold of the transmission power of the CR pilot signal. Alternatively, the preoccupied BS 310 can divide the permissible level of interference of the CR system into multiple levels and set the transmission power of the CR pilot signal to correspond to each of the levels. Here, when the transmission power of the CR pilot signal increases, the access permission level of the CR system decreases, and when the transmission power of the CR pilot signal decreases, the access permission level of the CR system increases.

When the transmission power of the CR pilot signal is determined through the operations above, the preoccupied BS 310 transmits the CR pilot signal with the determined transmission power in operation S430. The CR pilot signal can be periodically or a periodically transmitted.

Figure 5:
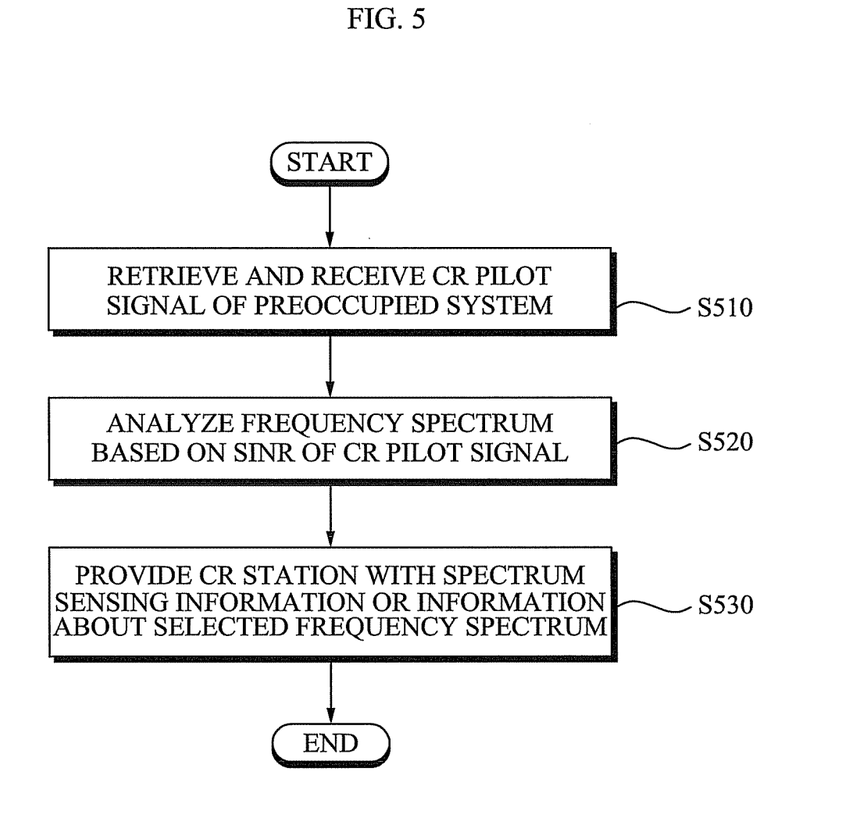
FIG. 5 illustrates an operation of a CR terminal of FIG. 3.

FIG. 5 illustrates an operation of a CR terminal receiving a CR pilot signal according to an embodiment of the present invention. In operation S510, the CR terminal senses whether the CR pilot signal of a preoccupied system is received, when using a frequency spectrum which can be used in the preoccupied system. The CR terminal can sense only CR pilot signals corresponding to a frequency spectrum to be used by the CR terminal, sense CR pilot signals corresponding to all frequency spectrums which can be supported by a CR system, or sense only CR pilot signals which are allocated to the preoccupied system, not allocated according to a specific frequency spectrum.

In operation S520, the CR terminal analyzes the frequency spectrum based on a signal interference and noise ratio (SINR) of a corresponding CR pilot signal. When an SINR of the CR pilot signal corresponding to the frequency spectrum to be used is greater than a predetermined value, it is recognized that the preoccupied system using the frequency spectrum exists and thus, the frequency spectrum is not used. Also, the CR terminal retrieves and uses a frequency spectrum not used in the preoccupied system. When sensing only the CR pilot signal corresponding to the frequency spectrum to be used by the CR terminal in operation S510, the CR terminal selects any one of the frequency spectrums which can be supported by the CR terminal, excluding frequency spectrums determined to be unusable in operation S510, and performs the sensing in operation S510 and the analyzing in operation S520.

When sensing the CR pilot signals corresponding to all the frequency spectrums which can be supported by the CR system in operation S510, the CR terminal can select any one of the frequency spectrums excluding the frequency spectrums determined to be unusable in operation S510, without later repeating the sensing in operation S510 and the analyzing in operation S520.

In operation S530, when the frequency spectrum selected by the CR terminal is not a frequency spectrum being used in the preoccupied system, the selected frequency spectrum is used and spectrum sensing information or information about the selected frequency spectrum is provided to a CR BS.

A preoccupied BS according to an embodiment of the present invention can include at least one directional antenna. The preoccupied BS transmits a CR pilot signal, separately from a pilot signal transmitted in a prior process to communicate with terminals in the preoccupied system. The CR pilot signal is for preventing interference due to the CR system. Also, the CR terminal sensing the CR pilot signal does not use the frequency spectrum corresponding to the CR pilot signal. The transmission power of the CR pilot signal transmitted by the preoccupied BS is determined according to load of the preoccupied system, which is not described here since it has already been described in detail with reference to FIG. 3.

When a load of a system to which the preoccupied BS belongs is significant, the preoccupied BS increases transmission power of the CR pilot signal. When the load is insignificant, the preoccupied BS decreases the transmission power of the CR pilot signal. When the load is different for each area in the preoccupied system, the transmission power of the CR pilot signal can be controlled for each of the areas.

For example, when load of a particular area in a coverage of the preoccupied system is significant, a transmission power value of a CR pilot signal transmitted towards a corresponding area can be controlled to be greater than a transmission power value of a CR pilot signal transmitted towards another direction. Specifically, the preoccupied BS can segment the coverage of the preoccupied system at 30 degree intervals around the preoccupied BS, divide the coverage into twelve areas, and calculate load of each of the twelve areas. Also, a CR pilot signal is transmitted to a corresponding area with transmission power set for each of the twelve areas based on the calculated load. A method of segmenting the area of the preoccupied system can vary according to a base station designer.

Figure 6:
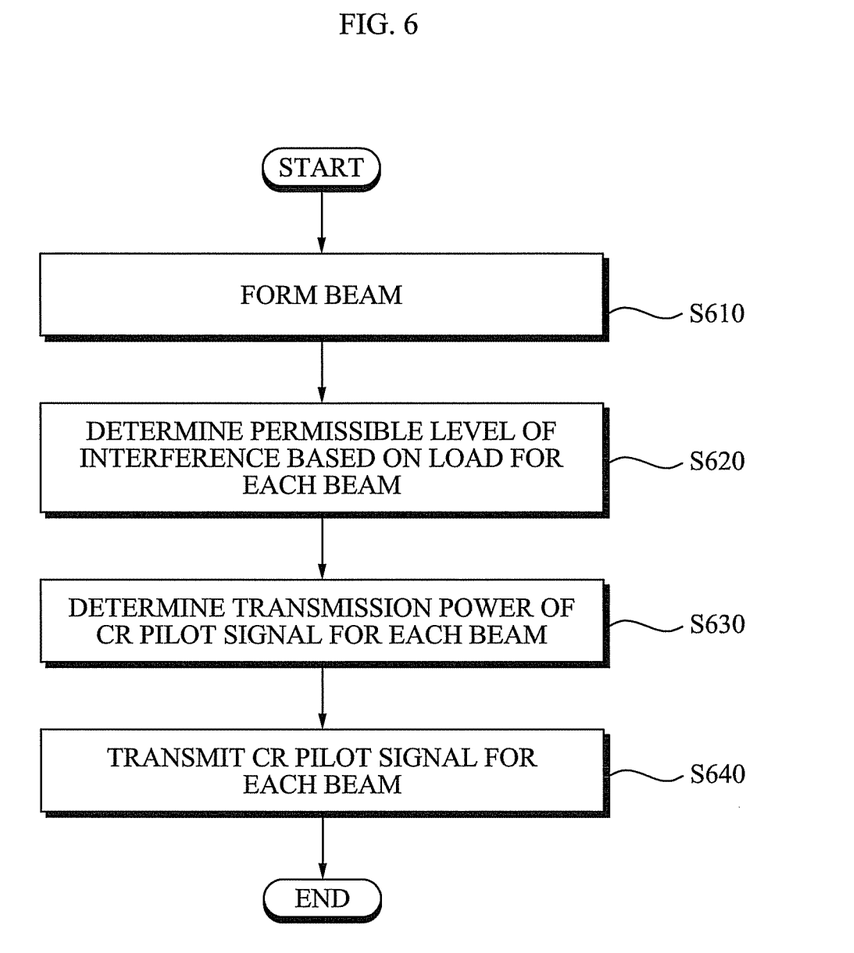
FIG. 6 illustrates an operation of a preoccupied station according to another embodiment of the present invention.

FIG. 6 illustrates an operation of a preoccupied BS according to another embodiment of the present invention. The preoccupied BS includes at least one directional antenna such as a beamforming antenna and array antenna which can transmit a CR pilot signal in a particular direction.

In operation S610, the preoccupied BS forms a beam to transmit the CR pilot signal, and the beam can be formed in various directions towards segmented areas of a preoccupied system. When the areas of the preoccupied system are radially segmented around the preoccupied BS, the areas can be segmented according to a particular direction angle.

In operation S620, the preoccupied BS measures a load for each beam area and determines a permissible level of interference of a CR system based on the measured load. When the load of the preoccupied system is significant, the permissible level of interference is to be decreased to be less affected by a CR terminal. When the load of the preoccupied system is insignificant, the permissible level of interference by the CR terminal can be increased. The permissible level of interference can be referred to as an access permission level of a CR system. When the permissible level of interference is significant, the access permission level of the CR system is also significant.

In operation S630, the preoccupied BS determines transmission power of the CR pilot signal for each beam based on the determined permissible level of interference by the CR system. When the permissible level of interference by the CR system is significant, the preoccupied BS decreases the transmission power of the CR pilot signal. When the permissible level of interference by the CR system is insignificant, the preoccupied BS increases the transmission power of the CR pilot signal. Specifically, as the permissible level of interference of the CR system increases, the preoccupied BS can set the transmission power of the CR pilot signal to be gradually increased, and to be between a minimum threshold and a maximum threshold of the transmission power of the CR pilot signal. Alternatively, the preoccupied BS can divide the permissible level of interference of the CR system into multiple levels and set the transmission power of the CR pilot signal to correspond to each of the levels. Here, when the transmission power of the CR pilot signal increases, the access permission level of the CR system decreases, and when the transmission power of the CR pilot signal decreases, the access permission level of the CR system increases.

When the transmission power of the CR pilot signal is determined through the operations above, the preoccupied BS transmits the CR pilot signal for each of the beams with the determined transmission power in operation S640. The CR pilot signal can be periodically or a periodically transmitted.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method of a preoccupied base station to reduce interference in a Cognitive Radio (CR) environment, the method comprising:
    transmitting a basic pilot signal to at least one terminal that is served by the preoccupied base station; and
    transmitting a CR pilot signal to at least one CR terminal within a coverage area of the preoccupied base station, that is not served by the preoccupied base station but is instead served by a CR base station, wherein:
    the transmitted CR pilot signal comprises a signal pattern that identifies a frequency spectrum that is being used by the preoccupied base station, and
    the preoccupied base station divides the frequency spectrum into a plurality of spectrums, generates a unique CR pilot signal for each respective spectrum, and transmits the CR pilot signal for the respective spectrum that is being used by the preoccupied base station.

2. The method of claim 1, wherein the signal pattern corresponds to a system feature of the preoccupied base station.

3. The method of claim 1, further comprising:
    measuring a load of the preoccupied base station; and
    determining a transmission power of the transmitted CR pilot signal based on the measured load.

4. The method of claim 3, wherein the determining increases the transmission power of the transmitted CR pilot signal as the load increases.

5. The method of claim 3, wherein the transmission power of the transmitted CR pilot signal has a value between a predetermined transmission power minimum threshold and a predetermined transmission power maximum threshold.

6. The method of claim 1, wherein the preoccupied base station includes at least one directional antenna, and the transmitting of the CR pilot signal comprises:
    forming at least one beam to transmit the CR pilot signal;
    determining a transmission power of the CR pilot signal for each beam; and
    transmitting the CR pilot signal for each beam.

7. The method of claim 6, wherein the transmission power of the transmitted CR pilot signal is determined based on a load of the preoccupied base station, and the load is measured for each beam.

8. The method of claim 7, wherein the transmission power of the transmitted CR pilot signal increases as the load increases.

9. A preoccupied base station to reduce interference in a Cognitive Radio (CR) environment, wherein the preoccupied base station:
    transmits a basic pilot signal to at least one terminal served by the preoccupied base station, and
    transmits a CR pilot signal to at least one CR terminal within a coverage area of the preoccupied base station, that is not served by the preoccupied base station but is instead served by a CR base station, wherein:
    the CR environment includes a plurality of frequency spectrums and at least one of the frequency spectrums has a CR pilot signal with a different signal pattern than CR pilot signals of the other frequency spectrums,
    the transmitted CR signal comprises a signal pattern that identifies a frequency spectrum that is being used by the preoccupied base station,
    the preoccupied base station includes a plurality of directional antennas, the plurality of directional antennas transmit a plurality of CR pilot signals in various directions toward segmented areas of a preoccupied system, and
    transmission power for each of the transmitted CR pilot signals is determined based on a load for a corresponding segmented area.

10. A method of a cognitive radio (CR) terminal for reducing interference in a CR environment, the method comprising:
    receiving a basic pilot signal from a CR base station that serves the CR terminal via a frequency spectrum;
    sensing whether a CR pilot signal has been received from a preoccupied base station that does not serve the CR terminal via the frequency spectrum, wherein the CR pilot signal has a signal pattern that identifies a frequency spectrum that is being used by the preoccupied base station; and
    in response to receiving the CR pilot signal from the preoccupied base station, preventing the CR terminal from transmitting data on the identified frequency spectrum, wherein
    the preoccupied base station divides the frequency spectrum into a plurality of spectrums, generates a unique CR pilot signal for each respective spectrum, and transmits a CR pilot signal for the respective spectrum that is being used by the preoccupied base station.

* * * * *